Figures 1, 2:
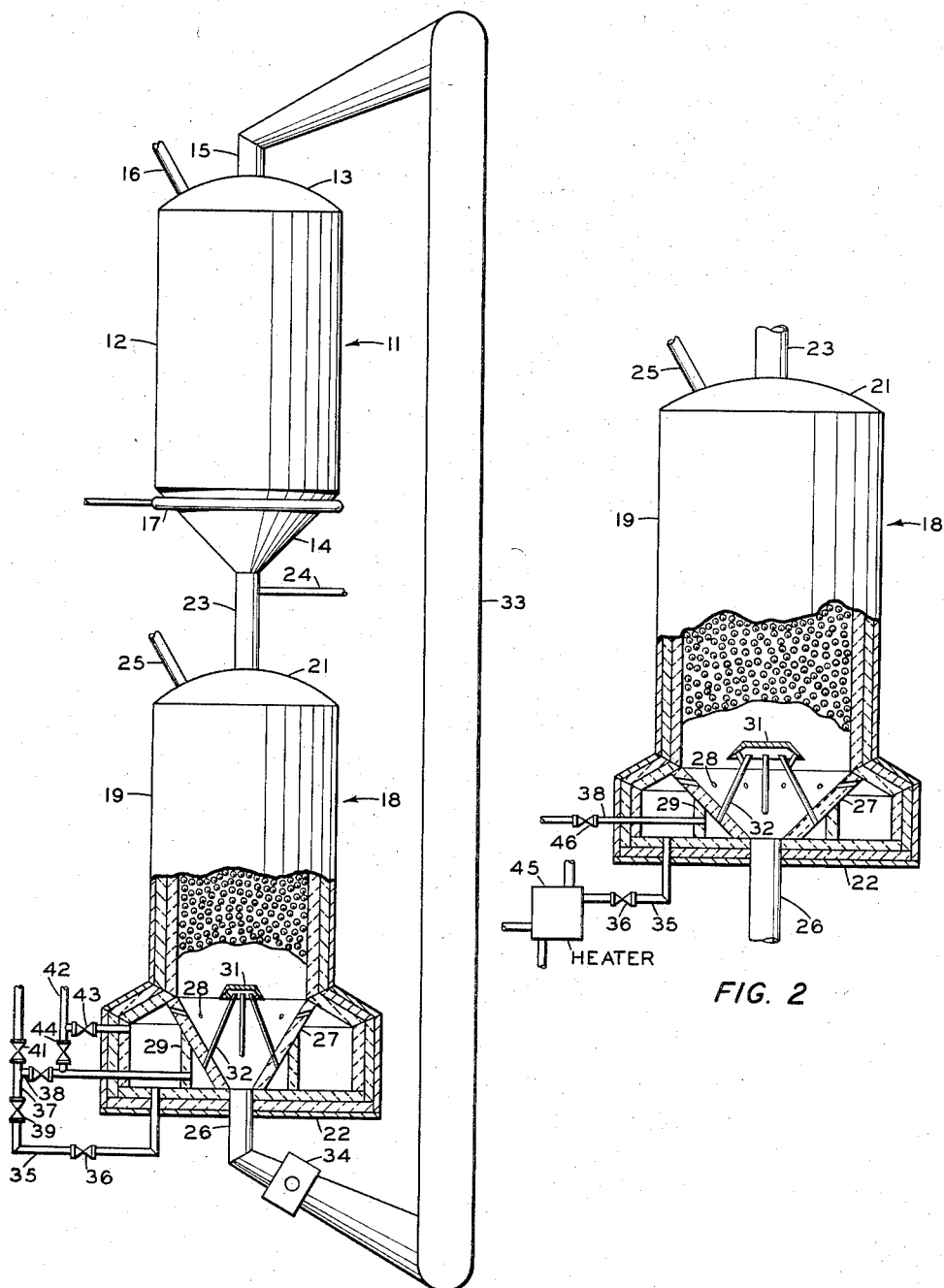

July 15, 1958 R. L. McINTIRE 2,843,532
METHOD FOR CONVERTING HYDROCARBONS
Filed Dec. 10, 1951

INVENTOR.
R. L. McINTIRE
BY Hudson and Young
ATTORNEYS

United States Patent Office 2,843,532
Patented July 15, 1958

2,843,532
METHOD FOR CONVERTING HYDROCARBONS

Robert L. McIntire, Bartlesville, Okla., assignor to Phillips Petroleum Company, a corporation of Delaware Application December 10, 1951, Serial No. 260,837

6 Claims. (Cl. 196—55)

This invention relates to the conversion of hydrocarbons. In one of its more specific aspects, it relates to the conversion of hydrocarbons in pebble heater apparatus. In other of its more specific aspects, it relates to a method of operating pebble heater apparatus so as to materially overcome inherent temperature differentials in the reactor chamber.

Thermal conversion processes which are carried out in so-called pebble heater apparatus utilize a gravitating mass of solid heat exchange material, which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a gravitating bed of solid heat exchange material which flows downwardly through the chamber in direct heat exchange with hot gaseous heat exchange material. The solid heat exchange material is heated to a high temperature in the heat exchange and is then gravitated to a second chamber in which the hot solid heat exchange material is caused to contact gaseous reactant materials in a second direct heat exchange relation furnishing heat for the treatment or conversion of the gaseous materials.

Conventional pebble heater chambers of pebble heater apparatus are generally formed as cylinders in which a solid heat exchange material is collected in the form of a gravitating bed. Hot heat exchange gases are sometimes introduced into the cylindrical bed at its periphery and at its lower end portion and are sometimes introduced through a refractory arch which supports the moving pebble bed. The solid heat exchange material is drawn from substantially a central point in the bottom of the bed and is passed downwardly into a gas heating chamber where a second moving bed of solid heat exchange material is formed.

One disadvantage in the operation of conventional pebble reaction chambers is that it is most difficult to establish uniform flow of reactant materials in contact with uniformly heated pebbles from the pebble heater chamber. In the withdrawal of solid heat exchange material from a substantially central point in the bottom of a pebble reaction chamber, the moving solid heat exchange material tends to form an inverted cone substantially conforming to the angle of repose of pebbles. That material which is below and outside of the cone remains in which is substantially a stagnant area. At the same time, when solid heat exchange material is introduced centrally into the upper portion of the pebble reaction chamber, the top of the solid heat exchange material forms a cone extending downwardly and outwardly from the solid material inlet in the top of the chamber. It will thus be seen that the gravitating pebble bed is of lesser thickness at its periphery than at its axis because of the fact that the top and bottom of the bed form oppositely extending cones.

Reactant materials which are introduced into the reaction chamber are raised to conversion temperature by direct heat exchange with the hot solid heat exchange material in the reaction chamber and resulting reaction products are removed from the upper portion of the reaction chamber. The gaseous material which flows upwardly through the gravitating bed of solid heat exchange material within the reaction chamber tends to follow the path of least resistance. That path of least resistance would be along the periphery of the gravitating solid material bed inasmuch as the bed is thinner at its periphery than at its axis. A large portion of the non-uniform gas flow through a reaction chamber is due to the fact that gases tend to flow toward cool areas and the peripheral portion of the reaction chamber is the coolest area of the gravitating solid material bed within the reaction chamber. The gases are caused to expand more in the hot areas of the reaction chamber than in the cooler areas of that chamber. Thus flow of gaseous material to the cooler areas results. As hydrocarbons are converted in the cooler areas of the reaction chamber they are caused to expand, thus preventing further expansion of gases into the cooler areas in the pebble bed.

There are several reasons why the peripheral portion of the solid material bed is cooler than the axial portion thereof. It has been known for some time that solid materials flowing through the central portion of the reaction chamber gravitate more rapidly than do the solid materials in the peripheral portion of the bed unless gravitation in the axial portion is retarded by some flow control means, such as baffles, or the like. Thus the solid materials flowing through the central portion of the bed normally have less unit contact time with the gaseous materials in the reaction chamber and give up less of their heat to those materials than do solid materials flowing at a lower flow rate. On the other hand, the solid heat exchange material flowing through the peripheral portion of the solid heat exchange material bed is caused to contact gaseous material for a longer period of time by reason of its lower flow rate, thus giving up greater amounts of heat to the reactant and product materials. As the peripheral portion of the solid material of the contact bed gives up greater amounts of heat to the gaseous materials, that portion of the bed is cooled, thus allowing expansion of greater amounts of gaseous materials thereinto. Those gases in turn gain additional heat from the peripheral portion of the solid heat exchange material, lowering the temperature of that solid material still further.

Still another important reason for non-uniform temperature is found in the fact that as solid materials are introduced into the top of the reaction chamber they are caused to contact some gaseous material while at the peak of the cone of solid material formed at the top of the solid material bed. As the solid material rolls downwardly and outwardly over the top of the solid material bed, the solid material contacts even more of the gaseous materials, giving up heat thereto. Thus, as the solid material finally reaches the peripheral portion of the solid material bed it has given up much more heat to gaseous material than has solid material which remains as an axial portion of the solid material bed. The temperature differential of pebbles across the top of the pebble bed between the axial portion and the peripheral portion thereof generally varies within the range of 100° F. and 250° F. depending upon the gas flow rate and pebble flow rate. An additional portion of the heat is removed from the peripheral portion of the solid material contact bed by heat transfer through the walls of the reaction chamber.

In view of the above discussion, it is quite apparent that ordinarily a great temperature differential exists between the axial portion of the gravitating solid material contact bed and the peripheral portion thereof. Obviously time-temperature conditions to which the gases in the axial portion of the pebble mass are subjected are much more severe than those conditions to which gases flowing through the peripheral bed portion are subjected. Many attempts have been made to overcome this problem of uneven temperature distribution in the reaction chamber such as providing baffle members which substantially retard gravitation of pebbles through the central portion of the contact material bed, thereby providing greater unit contact time in the axial portion of the contact material bed and thus materially improving the temperature distribution. It is obvious, however, even though flow of pebbles through the length of the reaction chamber is brought to a more uniform rate by means of baffle members and the like, temperature differences still exist by reason of the heat loss of the solid contact material in its travel from the axial to the peripheral portion of the contact bed upon introduction into the reaction chamber and also heat loss through the wall of the reaction chamber.

Solid heat exchange material which is conventionally used in pebble heater apparatus is generally called "pebbles." The term "pebbles" as used herein denotes any solid refractory material of flowable size and form having strength, which is suitable to carry large amounts of heat from the pebble heating chamber to the gas heating chamber without rapid deterioration or substantial breaking. Pebbles conventionally used in pebble heater apparatus are substantially spherical in shape and range from about 1/8 inch to about 1 inch in diameter. In a high temperature process, pebbles having a diameter of between about 1/4 to 3/8 inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic as used in any selected process.

By at least one aspect of this invention, at least one of the following objects is obtained. An object of this invention is to provide an improved method for operating pebble heater apparatus. Another object of the invention is to provide a method for operating the reactor of pebble heater apparatus so as to obtain more uniform temperatures in any given cross section thereof. Another object of the invention is to provide a method for augmenting the heat carried into the peripheral portion of the reactor chamber by hot pebbles. Another object of the invention is to reduce the temperature differential between the axial and peripheral portions of the pebble bed within a pebble reactor. Other and further objects and advantages will be apparent to those skilled in the art upon study of the accompanying disclosure and the drawings.

Broadly speaking, this invention comprises the introduction of a feed comprising a single hydrocarbon or mixture into both the axial and the peripheral portions of the lower end of a pebble reactor chamber and controlling the "quality" of the feed to each bed portion so as to maintain an increased ratio of B. t. u.'s available for cracking per pound of hydrocarbon in the peripheral portion of the pebble bed to the B. t. u.'s available for cracking per pound of hydrocarbon in the axial portion of the pebble bed over that obtained when a feed of a single quality is used. By the term "quality" I mean to include either the feed composition, the temperature thereof, or both. In one modification, the hydrocarbon feed, which is introduced into the peripheral portion of the reactor, is raised to a temperature of between 750° F. and 1200° F. higher than the temperature of the hydrocarbon feed introduced into the axial portion of the reactor. In another modification of the invention, air or oxygen is introduced in a controlled amount into the peripheral portion of the reactor chamber together with the hydrocarbon feed thereto. The amount of air or oxygen which is introduced into the peripheral portion of the reactor is less than a stoichiometric amount. This introduction of air or oxygen into the peripheral portion of the reactor results in a partial combustion of the feed, thereby augmenting the heat introduced into the peripheral portion of the reactor chamber. In another modification, the hydrocarbon feed is introduced into the axial and peripheral portions of the reactor chamber at the same temperature and an inert diluent gas is introduced into the axial portion of the reactor so as to dilute the hydrocarbon feed stream therein.

Better understanding of this invention will be obtained upon reference to the drawings wherein Figure 1 is a schematic sectional elevation of a pebble heater apparatus utilizing a reactor chamber provided with inlet conduits to permit the introduction of feeds into the axial and peripheral portions thereof in accordance with this invention. Figure 2 is a schematic elevation of a reactor chamber of this invention which is adapted for the introduction of a preheated hydrocarbon feed into the peripheral portion of that chamber.

Referring particularly to the device shown in Figure 1 of the drawings, pebble heater chamber 11 comprises upright shell 12 closed at its upper and lower ends by closure member 13 and 14, respectively. Pebble inlet conduit 15 and gaseous effluent conduit 16 are provided in the upper end of chamber 11, preferably in closure member 13. Heating material inlet conduit 17 is connected to the lower end of chamber 11 and preferably communicates with the interior of that chamber through closure member 14. Reactor chamber 18 comprises upright shell 19 closed at its upper and lower ends by closure members 21 and 22, respectively. Pebble conduit 23 extends between closure member 14 of chamber 11 and the upper end of chamber 18. Sealing material inlet conduit 24 extends into pebble conduit 23 intermediate its ends. Gaseous effluent conduit 25 is provided in the upper portion of chamber 18, preferably in closure member 21. Pebble outlet conduit 26 is provided in the bottom of chamber 18. Chamber floor 27 extends inwardly and downwardly from the wall of shell 19 to conduit 26 forming a first gas distribution chamber with the wall of shell 19 and closure member 22. Gaseous material conduits 28 extend from the first gas distribution chamber into the peripheral and lower portion of the reactor chamber. Closure member 29 forms a second gas distribution chamber with floor 27 and closure member 22.

Pebble baffle 31 is provided within the lower portion of chamber 18 and is spaced above and coaxially with pebble conduct 26. Conduits 32 extend upwardly from floor 27 and communicate between the second gas distribution chamber and the lower side of baffle 31. If a center baffle is not desired within the lower portion of chamber 18, baffle member 31 may be replaced by a gaseous material distributor of any type, such as an annular header member. Elevator 33 may be either a mechanical type, such as a screw conveyor or a bucket-type elevator as shown, or may be a gas-lift type elevator. Pebble feeder 34, which may be any conventional type type of pebble feeder, is provided in conduit 26 intermediate the lower end of chamber 18 and elevator 33. Elevator 33 is connected at its upper end to pebble conduit 15.

Feed conduit 35 is connected to the first gas distribution chamber. Valve 36 is provided intermediate the ends of that conduit. A second fluid conduit 37 is connected to conduit 35 upstream of valve 36 and is also connected to a third fluid conduit 38. Conduit 38 extends from conduit 37 to the second gas distribution chamber. Valve 39 is provided in conduit 37 intermediate conduit 38 and conduit 35. Valve 41 is provided in conduit 37 upstream of conduit 38. A fourth fluid conduit 42 is connected to the first gas distribution chamber and valve 43 is provided intermediate its ends. Conduit 42 is connected to conduit 38 upstream of valve 43, and valve 44 is provided intermediate conduits 42 and 38.

Referring particularly to Figure 2 of the drawings, parts identical with those described in Figure 1 are designated by like numerals. Reactor chamber 18 is the same as that described in connection with Figure 1 but a heater chamber 45 is provided in conduit 35 upstream of valve 36. Valve member 46 is provided in conduit 38.

In the operation of the device shown as Figure 1 of the drawings, pebbles are introduced into the upper portion of chamber 11 and gravitate downwardly therethrough as a contiguous, gas-pervious mass. Gaseous heating material is introduced into the lower portion of chamber 11 through conduit 17 and passes upwardly in direct heat exchange with and countercurrent to the flow of the pebble mass within that chamber. The pebbles are raised to a temperature, usually 100° F. to 200° F., above that of the inlet temperature for pebbles in chamber 18. Gaseous effluent is removed from the upper portion of chamber 11 through effluent outlet conduit 16 and the heated pebbles are gravitated through pebble conduit 23 into the upper portion of chamber 18 and gravitate downwardly through that chamber as a contiguous gas-pervious pebble mass. Inert sealing gas such as steam, hydrogen, or a normally gaseous hydrocarbon is introduced into pebble conduit 23 and prevents the flow of gaseous materials from either of chamber 11 or 18 to the other chamber through that throat. Pebbles which are gravitated from the bottom of chamber 18 are elevated to the upper portion of chamber 11 through elevator 33.

In one modification of this invention, a hydrocarbon feed is introduced by means of conduit 37 and conduits 35 and 38 into the first and second gas distribution chambers at substantially the same temperature. Air or oxygen is introduced into the first gas distribution chamber through conduit 42 and valve 43. The gaseous materials are introduced into the pebble mass within chamber 18 and flow upwardly therethrough in direct heat exchange with the pebbles and countercurrent to the gravitating flow thereof. The air or oxygen which is introduced into the peripheral portion of the pebble mass from the first gas distribution chamber is less than a stoichiometric amount and results in partial combustion of the hydrocarbon feed. It is preferred to use a ratio of free oxygen to hydrocarbon of not more than 0.3:1. This partial combustion adds materially to the heat provided to the gaseous materials in the peripheral portion of the pebble mass and results in a temperature in that portion of the bed which closely approximates that of the pebbles within the axial portion of the reactor chamber.

In the production of ethylene, reaction temperatures within the range of 1200° F. to 1800° F. are normally utilized. In the production of acetylene, somewhat higher temperatures are utilized, i. e., temperatures ranging generally between 1800° F. and 3000° F. When pure oxygen is introduced into the peripheral portion of the reactor, the resulting product is primarily CO. When air is introduced into that portion of the reaction chamber, the resulting combustion products are primarily CO and $N_2$.

In another modification of the invention, a single feed of hydrocarbon is divided into two portions. One portion is introduced into the first gas distribution chamber by means of conduits 37 and 35. A second portion of the hydrocarbon feed, generally not more than 50 percent and preferably not more than 25 percent of that of the first portion is introduced by means of conduits 37 and 38 into the second gas distribution chamber. The hydrocarbon streams are at substantially the same temperature and a gas inert to the reaction in the reaction chamber, such as natural gas, steam or nitrogen is introduced into the second gas distribution chamber through conduit 42 and valve 44. Operation in this manner increases the severity of the time-temperature conditions in the peripheral portion of the pebble bed by decreasing the heat in the pebbles which is consumed by the feed to the axial portion of the bed and increases the effective heat delivered to the feed to the peripheral portion. Operation in this manner may also decrease the severity of the time-temperature conditions in the axial portion of the pebble bled by decreasing the temperature of the feed thereto, depending upon the diluent or the temperature of the feed. All three of these changes are brought about by feeding to the axial portion of the reactor chamber a mixture of the hydrocarbon feed and an inert diluent such as steam, natural gas, or nitrogen. Natural gas, which generally comprises methane and ethane may be inert only when cracking such gaseous hydrocarbons as propane and butane or heavier material since the reaction conditions would ordinarily not be sufficient to crack the natural gas. The depth of cracking in the central portion of the reactor is more nearly that obtained in the peripheral portion of the reactor because of the three results enumerated above. Gaseous effluent is removed from the upper portion of chamber 18 through effluent conduit 25.

In yet another modification of this invention, the hydrocarbon feed is introduced into the second gas distribution zone at a temperature within the range of between about 100° F. and 250° F. A second stream of the same pure hydrocarbon feed is passed through a heater 45, as shown in Figure 2 of the drawings, and is elevated to a temperature within the range of between 1000° F. and 1300° F. This second stream of hydrocarbon is introduced at its elevated temperature into the peripheral portion of the reactor thus supplying additional heat to that portion of the pebble mass so as to obtain more nearly uniform reaction temperatures within that chamber.

Better understanding of this invention will be obtained upon study of the following calculations which were based upon actual operation of a pebble heater having a central pebble inlet and a central pebble outlet. For the purpose of these calculations gas-flow elements A and B are designated. A is one located near the axis of the pebble bed and the gas-flow element B is located near the periphery of the bed. A hydrocarbon feed having a mol composition of methane 20.9 percent, ethane 55.6 percent and propane of 23.5 percent was used in obtaining all of the following calculations:

EXAMPLE 1

The data set forth below in Table I were obtained by calculations based upon the operation of a pebble heater reactor having a single pebble inlet conduit and a single pebble outlet conduit. The feed is introduced into both the axial and peripheral portions of the bed at the same temperature and equal amounts of feed are introduced in both of the elements. The data obtained by calculations are set forth in Table I as follows:

Table I

| Gas Flow Element | A | B | Average |
|---|---|---|---|
| Pebble Inlet Temp., °F | 1,624 | 1,480 | |
| Pebble Outlet Temp., °F | 1,167 | 900 | |
| Feed in Temp., °F | 100 | 100 | |
| Ethane Conversion, Wt. percent | 62.4 | 8 | 17.6 |
| Propane Conversion, Wt. percent | 95.2 | 30 | 21.9 |
| Lb. Hydrocarbon cracked/100 lb. Feed | 57.5 | 11.5 | 34.3 |
| Pebble Rate, lb./hr | | | 41,000 |
| Feed Rate, s. c. f./hr | | | 61,500 |

From these calculations it is quite apparent that conditions in the peripheral portion of the pebble bed are not conducive to good conversion of either ethane or propane so as to in any respect approach the conversion obtained in the axial portion of the pebble bed.

EXAMPLE 2

50 percent of the entire feed is preheated to a temperature of 1300° F. and that preheated portion of the feed is used in the peripheral portion of the pebble bed. Data obtained by calculations based upon this preheating of a portion of the feed are set forth below in Table II.

Table II

| Gas Flow Element | A | B | Weighted Average |
|---|---|---|---|
| Pebble Inlet Temp., °F | 1,624 | 1,480 | |
| Pebble Outlet Temp., °F | 1,167 | 1,345 | |
| Feed Inlet Temp., °F | 100 | 1,300 | |
| Ethane Conversion, Wt. percent | 62.4 | 43.0 | 52.7 |
| Propane Conversion, Wt. percent | 95.2 | 85.0 | 90.1 |
| Lb. H/C Cracked/100 lb. Feed | 57.5 | 43.8 | 50.6 |
| Pebble Rate, lb./hr | | | 41,000 |
| Feed Rate, s. c. f./hr | 30,750 | 30,750 | 61,500 |
| Preheater Duty, mm. B. t. u./hr | | 2.17 | 2.17 |

It should be noted that by making the number of B. t. u. available in the peripheral portion of the bed more nearly approach the number of B. t. u. available for conversion in the hydrocarbon in the axial portion of the bed, the conversion obtained in the peripheral portion of the bed approaches that obtained in the axial portion of the bed.

EXAMPLE 3

The advantage which is to be obtained by the use of an inert diluent is demonstrated by the calculations set forth below in Table III. Steam is used as a diluent for the hydrocarbon feed in the axial portion of the pebble bed.

Table III

| Gas Flow Element | A | B | Weighted Average |
|---|---|---|---|
| Pebble Inlet Temp., °F | 1,624 | 1,500 | |
| Pebble Outlet Temp., °F | 1,167 | 900 | |
| Feed inlet Temp., °F. (H/C) | 100 | 100 | |
| Steam inlet Temp., °F | 220 | | |
| Ethane Conversion, Wt. percent | 62.4 | 10.2 | 17.9 |
| Propane Conversion, Wt. percent | 95.2 | 35.0 | 44.1 |
| Lb. Hydrocarbon Crkd./100 lb. Feed | 57.5 | 14.0 | 20.4 |
| Pebble Rate, lb./hr | | | 41,000 |
| H/C Feed Rate, s. c. f./hr | 7,100 | 40,000 | 47,100 |
| Steam Feed, lb./hr | 685 | 0 | 685 |

A comparison of the conversion data set forth in Table III with those set forth in Table I will indicate the increase in conversion of both ethane and propane in the peripheral portion of the bed upon the use of the steam diluent. It should be noted that these data set forth in Table III are not as favorable to the instant invention as would be data based upon a diluent having a temperature which is the same or lower than that of the hydrocarbon feed.

EXAMPLE 4

The advantage to be obtained by utilizing a partial combustion in the peripheral portion of the pebble bed is exemplified by calculations set forth below in Table IV:

Table IV

| Gas Flow Element | A | B | Weighted Average |
|---|---|---|---|
| Pebble Inlet Temp., °F | 1,624 | 1,490 | |
| Pebble Outlet Temp., °F | 1,167 | 1,050 | |
| Feed Inlet Temp., °F | 100 | 100 | |
| Air Inlet Temp., °F | | 100 | |
| Ethane Conversion, Wt. percent | 62.4 | 38.0 | 45.8 |
| Propane Conversion, Wt. percent | 95.2 | 80.5 | 85.2 |
| Lb. H/C Crkd./100 lb. Feed | 57.5 | 49.4 | 52.0 |
| Pebble Rate, lb./hr | | | 41,000 |
| H/C Feed Rate, s. c. f./hr | 18,400 | 39,100 | 57,500 |
| Air Feed Rate, s. c. f./hr | 0 | 25,000 | 25,000 |

It will be noted that the conversion of ethane and propane in the peripheral portion of the pebble bed approaches that to be obtained upon preheat of the feed introduced into the peripheral portion of the chamber.

These calculated data are presented solely for the purpose of exemplifying the invention and should not be used to unduly limit the scope of the invention.

Many other modifications and advantages of this invention will be apparent to those skilled in the art upon study of the accompanying disclosure and the drawings. It is believed that such modifications are clearly within the scope and intent of this invention.

I claim:

1. A process for the pyrolytic conversion of hydrocarbons which comprises in combination the steps of heating pebbles in a pebble heating zone to a desired reaction temperature; gravitating said pebbles into the upper end portion of said reaction zone and downwardly therethrough as a contiguous gas-pervious mass; introducing a first feed comprising at least one reactant hydrocarbon in gaseous form into the lower axial portion of said reaction zone; introducing into the lower peripheral portion of said reaction zone a second gaseous feed, having as reactant hydrocarbons only those present in said first feed; passing said feeds upwardly through said hot pebble mass in direct heat exchange therewith, whereby at least a portion of each feed is raised to reaction temperature; adjusting at least one of the qualities, temperature and composition, of each feed so as to maintain an increased number of B. t. u.'s available for cracking per pound of hydrocarbon in the peripheral portion of the pebble mass with respect to the B. t. u.'s available for cracking per pound of hydrocarbon in the axial portion of the pebble mass over that available when a feed of one quality is used in both zone portions; removing resulting reaction products from the upper portion of said reaction zone; gravitating said pebbles from the lower end portion of said reaction zone; and returning said pebbles through said pebble heating zone to the upper end portion of said reaction zone.

2. A process for the pyrolytic conversion of hydrocarbons which comprises in combination the steps of heating pebbles in a pebble heating zone to a desired reaction temperature; gravitating said pebbles into the upper end portion of a reaction zone and downwardly therethrough as a contiguous gas-pervious mass; introducing a first portion of a hydrocarbon feed in gaseous form into the lower axial portion of said reaction zone; preheating a second portion of said hydrocarbon feed to a temperature of between 750° F. and 1200° F. higher than the inlet temperature of said first said feed portion; introducing said preheated second feed portion into the lower peripheral portion of said reaction zone; passing said feeds upwardly through said hot pebble mass in direct heat exchange therewith, whereby at least a portion of each feed is raised to reaction temperature; removing resulting reaction products from the upper end portion of said reaction zone; removing said pebbles from the lower end portion of said reaction zone; and returning said pebbles through said pebble heating zone to the upper end portion of said reaction zone.

3. The process of claim 2 wherein said first portion of hydrocarbon feed is introduced into the lower axial portion of said reaction zone at a temperature of between 100° F. and 250° F.; and said second feed portion is introduced into the lower peripheral portion of said reaction zone at a temperature of between 1000° F. and 1300° F.

4. A process for the pyrolytic conversion of hydrocarbons which comprises in combination the steps of heating pebbles in a pebble heating zone to a desired reaction temperature; gravitating said pebbles into the upper end portion of a reaction zone and downwardly therethrough as a contiguous gas-pervious mass; introducing a first portion of a hydrocarbon feed into the lower axial portion of said reaction zone; admixing an oxygen-containing gas selected from the group consisting of air and free oxygen with a second portion of said hydrocarbon feed in an amount less than stoichiometric; introducing said second portion of hydrocarbon feed containing said oxygen-containing gas into the lower peripheral portion of said reaction zone; passing said feeds upwardly through said hot pebble mass in direct heat exchange therewith; burning a portion of said second hydrocarbon feed portion with said oxygen-containing gas in the peripheral portion of said mass, whereby additional heat is provided in the peripheral portion of the mass; reacting the remaining hydrocarbon material in both the peripheral and axial portions of the pebble mass; removing the resulting reaction products from the upper end portion of said reaction zone; gravitating said pebbles from the lower end portion of said reaction zone; and returning said pebbles through said pebble heating zone to the upper end portion of said reaction zone.

5. A process for the pyrolytic conversion of hydrocarbons which comprises in combination the steps of heating pebbles in a pebble heating zone to a desired reaction temperature; gravitating said pebbles into the upper end portion of a reaction zone and downwardly therethrough as a contiguous gas-pervious mass; introducing a first hydrocarbon feed into the lower peripheral portion of the reaction zone; mixing a second portion of said hydrocarbon feed which is no more than 50 percent of that of said first hydrocarbon feed with a gas inert to the reaction carried on within the reaction zone; introducing a feed of said second hydrocarbon feed portion and diluent mixture into the lower axial portion of said reaction zone; passing said feeds upwardly through said hot pebble mass in direct exchange therewith whereby at least a portion of each feed is raised to reaction temperature; removing resulting reaction products from the upper portion of said reaction zone; gravitating said pebbles from the lower end portion of said reaction zone; and returning said pebbles through said pebble heating zone to the upper end portion of said reaction zone.

6. The process of claim 5 wherein said second portion of said hydrocarbon feed is no more than 25 percent of that of said first hydrocarbon feed.

References Cited in the file of this patent

UNITED STATES PATENTS

| | | |
|---|---|---|
| 2,338,573 | Creelman | Jan. 4, 1944 |
| 2,468,508 | Munday | Apr. 26, 1949 |
| 2,531,192 | Bergstrom | Nov. 21, 1950 |
| 2,531,365 | Simpson et al. | Nov. 21, 1950 |
| 2,532,606 | Church | Dec. 5, 1950 |
| 2,548,286 | Bergstrom | Apr. 10, 1951 |
| 2,560,343 | Hemminger | July 10, 1951 |
| 2,692,803 | Hachmuth | Oct. 26, 1954 |